United States Patent [19]

Ohori et al.

[11] 4,046,231
[45] Sept. 6, 1977

[54] DISC BRAKE

[75] Inventors: Harumi Ohori; Juichi Shibatani, both of Toyota, Japan

[73] Assignee: Toyota Jidosha Kogyo Kabushiki Kaisha, Toyota, Japan

[21] Appl. No.: 677,002

[22] Filed: Apr. 14, 1976

[30] Foreign Application Priority Data

Nov. 17, 1975   Japan .............................. 50-137248

[51] Int. Cl.² ............................................ F16D 65/02
[52] U.S. Cl. .................................. 188/71.1; 188/73.3
[58] Field of Search ................... 188/73.3, 72.4, 71.1, 188/73.4

[56] References Cited

U.S. PATENT DOCUMENTS

| 3,260,332 | 7/1966 | Wells | 188/73.6 |
| 3,625,314 | 12/1971 | Rinker | 188/73.3 X |

FOREIGN PATENT DOCUMENTS

| 1,510,612 | 12/1967 | France | 188/73.3 |
| 1,355,959 | 6/1974 | United Kingdom | 188/73.3 |
| 1,207,328 | 9/1970 | United Kingdom | 188/73.3 |
| 1,154,701 | 6/1969 | United Kingdom | 188/73.3 |

Primary Examiner—George E. A. Halvosa
Attorney, Agent, or Firm—Finnegan, Henderson, Farabow & Garrett

[57] ABSTRACT

In a disc brake of the type in which floating type calipers urge friction members against a brake disc, with the friction members being located on the opposite sides of the brake disc, a fixing member for attachment to a vehicle and for supporting the calipers for movement in the direction perpendicular to the plane of the brake disc, the fixing member comprising at least one U-shaped steel plate, extending in a plane substantially parallel with the brake disc and surrounding at least part of the calipers, the legs of the U-shaped steel plate acting as torque-receiving members and having secured to the ends thereof guide members for slidingly guiding the calipers in their movement. The fixing member preferably comprises two U-shaped steel plates having the upper parts of their legs bent in the directions opposite to each other, the steel plates being secured to each other in back-to-back relation, while the guide members are secured to the bent portions of the steel plates.

3 Claims, 3 Drawing Figures

DISC BRAKE

BACKGROUND OF THE INVENTION

1. Field of the Invention

This invention relates to the disc brake having floating type calipers which brakes a vehicle such as a motor vehicle, and more particularly to a fixing member including torque-receiving members adapted to support the calipers and guide members for guiding the calipers.

2. Description of the Prior Art

In general, fixing members for securing a disc brake to a body of a vehicle support calipers in a movable relation relative thereto, and receive a braking torque from friction pads being located for engaging opposite the surfaces of the brake disc.

Particularly, with the disc brake which is disclosed in the U.S. Pat. No. 3,625,314, a member for slidingly receiving the calipers and members for receiving torque are cast integrally.

However, the fixing members fabricated according to the above U.S. Patent necessitate complicated post machining for a knuckle-attaching portion, calipers supporting portions and the like. In addition, for achieving desired strength, the thickness of the relevant portions of the fixing members need to be increased or reinforced with large-sized ribs, so that such fixing members are relatively costly, heavy in weight and large in mass.

SUMMARY OF THE INVENTION

It is accordingly an object of the present invention to improve a disc brake of the type in which floating type calipers urge friction members against a brake disc to thereby effect a braking action, with the friction members being located on the opposite sides of the brake disc and in which the calipers are supported on torque-receiving members for movement in the direction perpendicular to the brake disc.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the fixing member for a disc brake of this invention comprises at least one U-shaped steel plate extending in a plane substantially parallel with the brake disc and surrounding at least part of the calipers. The leg of the U-shaped plate forming torque-receiving members to the ends of which are secured guide members for slidingly supporting the calipers.

Preferably the fixing member comprises two U-shaped steel plates having the upper parts of their legs bent in directions opposite to each other, these steel plates being secured to each other in back-to-back relation, while guide members are secured to the bent portions of the steel plates.

The accompanying drawings, which are incorporated in and constitute a part of this specification, illustrate an embodiment of the invention and, together with the description, serve to explain the principles of the invention.

BRIEF DESCRIPTIONS OF THE DRAWINGS

DESCRIPTIONS OF THE PREFERRED EMBODIMENTS

Reference will now be made in detail to the present preferred embodiment of the invention, an example of which is illustrated in the accompanying drawings.

Figure 1:
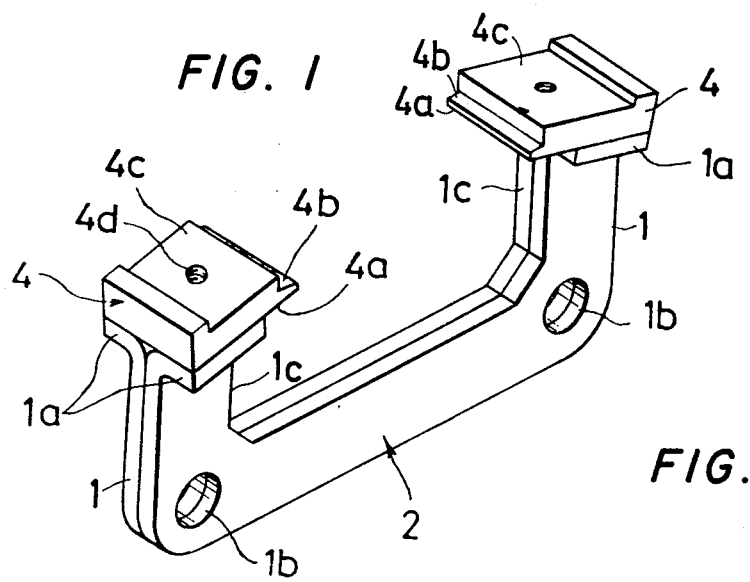
FIG. 1 is a perspective view of a fixing member including torque-receiving members and guide members, according to the present invention.
Figure 2:
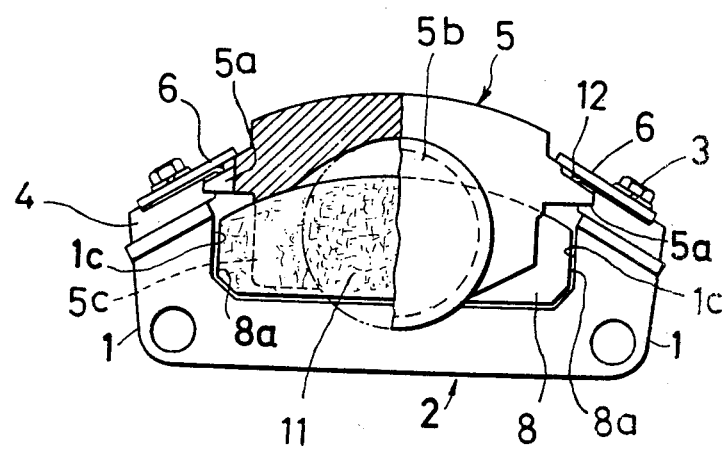
FIG. 2 is a front view of a disc brake including calipers, with the left half thereof partially broken away, including the fixing member of FIG. 1.
Figure 3:
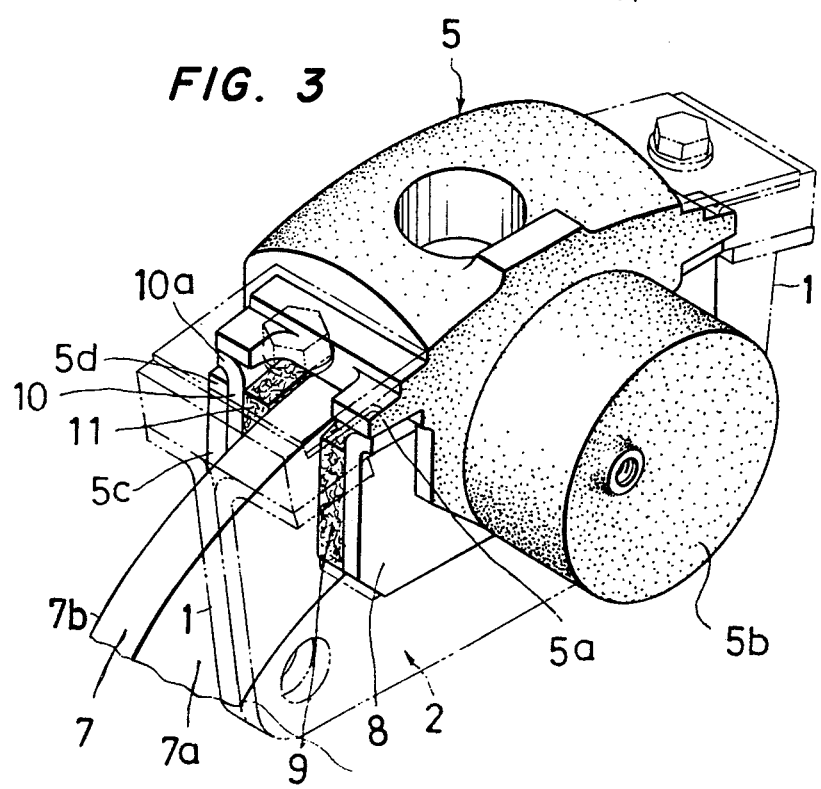
FIG. 3 is a perspective view of a disc brake, showing the fixing member according to the present invention in two-point broken lines.

Referring now to FIG. 1, there is shown a fixing member 2 which includes torque-receiving members 1 and guide members 4. FIGS. 2 and 3 show a front view and perspective view of a disc brake including the torque-receiving members 1, guide members 4 and calipers 5.

In accordance with the invention, preferably the fixing member 2 is fabricated by punching a steel plate into two U-shaped steel plates, then bending the upper parts of the legs of the U-shaped plates in the same direction, after which the U-shaped steel plates having flanges 1a thus formed are secured to each other in back-to-back relation, while the outer edges of the plates thus registered are welded.

Defined in the fixing member 2 are attaching holes 1b, by which the fixing member is secured to a knuckle (not shown) or a support bracket (not shown). In other words, by using the holes 1b, the disc brake may be attached directly to the knuckle or, through the medium or a support bracket, be secured to the body of the vehicle.

As embodied herein, the legs of the fixing member 2 in the U-shaped contour, provide torque-receiving members 1, the function of which will be described in detail hereinafter.

As embodied herein, the guide members 4 are manufactured by casting or forging, and formed with bottom surfaces 4a, which are to be placed on the flanges 1a of the torque-receiving members 1. In addition, the guide members 4 have sliding surfaces 4b for the calipers 5 and attaching surfaces 4c for holddown plates 6. The sliding surfaces 4b are positioned in opposing edges of the guide members 4 by providing an elongated notch in the guide member, thus forming a ledge having an upper surface 4b for slidingly receiving the calipers 5. Defined in the attaching surfaces 4c are threaded holes 4d. The guide members 4 are secured to the top of the flanges 1a mechanically or by welding.

The fixing member 2 is secured to the knuckle or support bracket of the vehicle in a manner that like flanges 1a and the guide members 4 extend over the disc to which the braking action is to be applied. In other words, both of the torque-receiving members 1 are proximate the disc 7 and a like side of each of the guide members 4 extends over the disc. The sliding surfaces 5a of the calipers 5 are placed on the sliding surfaces 4b of the guide members 4. A cylinder portion 5b of the calipers 5 is located on the opposite side of the disc 7 with respect to the U-shaped plates.

As well known in the art, caliper disc brakes operate by applying a friction brake member to one side of the brake disc and, through the caliper reaction, to a second friction brake member on the other side of the brake disc. In the caliper reaction, the calipers move axially across the edge of the brake disc. The application of the friction brake members to the rotating disc develops a torque in the friction brake members in the direction of rotation of the disc.

As embodied herein, the calipers 5 rest on the surfaces 4b of the guide members 4 and slide axially on the surfaces 4b with respect to the disc 7 when the brakes are applied to the disc.

The friction brake members include friction pad 9 directly applied to the disc 7 and the friction pad 11 applied to the disc 7 by the reaction of the calipers 5. The friction pads 9, 11 are mounted on backing plates 8, 10, respectively. The pad 11 and mounting plate 10 applied by the action of the calipers 5 are known, and referred to herein, as the reaction pad and reaction backing plate.

As embodied herein, the friction pads 9, 11 and mounting plates 8, 10 on the one hand and the inner surfaces of the fixing member 2 on the other are shaped to be complementary in contour. In the positioning of the calipers 5 on the sliding surfaces 4b of the guide members 4, at least one of the backing plates 8, 10, on the opposite sides of the disc 7, is aligned with inner surfaces of the torque-receiving members 1 of the U-shaped fixing member 2.

The outermost faces 8a of the backing plate 8, adjoin the inner sides 1c of the torque-receiving members 1, while the reaction backing plate 10 is formed with a flange 10a supported on a shoulder portion 5d of a reaction portion 5c of the calipers 5.

Hold-down plates 6 are secured through the medium of plate springs 12 to the guide members 4 by means of bolts 3 and the threaded holes 4d. Thus, the radial movement of the calipers 5 with respect to the disc 7 is restricted by the holddown plates 6.

In operation, when a braking-hydraulic pressure is fed into the cylinder portion 5b of the calipers 5, then a piston (not shown) pushes the backing plate 8 so as to urge the friction pad 9 against the disc surface 7a in the direction perpendicular thereto. At this time, the calipers 5 will move in the direction opposite to the direction of the piston, along the sliding surfaces 4b of the guide member 4, whereupon the backing plate 10 in the reaction portion 5c will be moved in a manner that the friction pad 11 thereon is urged against the disc surface 7b of disc 7 in the direction perpendicular thereto, thus braking the disc 7.

The braking torque thus produced by the action of the friction pads 9, 11 on the disc 7 is transmitted through the backing plate 8 to one or the other of the inner surfaces 1c of the torque-receiving members 1 on the one hand, and through the backing plate 10, then through the shoulder portion 5d of the caliper reaction portion 5c supporting the backing plate 10 to the ledge of the sliding surface 4b of the guide member 4, and thus to one or the other of the torque-receiving members 1 on the other.

The torque-receiving members 1 are made of steel plates which provide sufficient strength, as has been described earlier. As an alternative, the torque produced on the reaction friction pad 11 may be transmitted directly to the torque-receiving members 1 by forming the flange portion 10a of the backing plate 10 so as to have contact with the inner surfaces 1c of the torque-receiving members 1.

Upon completion of the braking action, the caliper 5 and friction pads 9, 11 are returned to their home positions.

It is apparent that, when the disc 7 is rotating clockwise, as viewed in FIG. 3, the torque developed by the application of the friction pads 9, 11 will be absorbed by the torque-receiving member 1 on the right side of the FIGS. 1-3. However, when the disc 7 is rotating counterclockwise, as viewed in FIG. 3, the torque will be absorbed by the torque-receiving member 1 on the left side.

As is apparent from the foregoing description of the disc brake according to the present invention, the fixing member which receives the braking torque may be made of high tension steel plates, thereby providing convenience in the layout of the disc brake and reduction in cost and weight. The fixing members may also be extended so as to be directly attached to a knuckle, thereby eliminating the use of a support bracket.

It will be apparent to those skilled in the art that various modifications and variations could be made in the fixing member for disc brake of the invention without departing from the scope of spirit of the invention.

What is claimed is:

1. In a disc brake of the type in which floating type calipers urge friction members against a brake disc for a braking action with said friction members being located on the opposite sides of said brake disc and in which said friction members receive a torque from said brake disc during braking and are supported on a fixing member so as to be movable in the direction perpendicular to the plane of brake disc, the improvement in the fixing member comprising:

a pair of U-shaped steel plates fixedly joined back-to-back and fixedly mounted adjacent, and in a plane substantially parallel, to said brake disc, said U-shaped steel plates each including a pair of legs surrounding at least a portion of said calipers, said legs being positioned proximate said friction members and interacting therewith for receiving torque during braking, the legs of each of the pairs of U-shaped steel plates terminating in a pair of end portions bent outwardly in opposing direction to form a pair of flanges in substantially the same plane, the outer surfaces of said flanges being substantially perpendicular to the plane of the plate, said joined pair of plates being fixedly mounted with a pair of like sides of said pair of flanges extending over said brake disc, guide members individually and rigidly secured to the outer surfaces of said associated pairs of said flanges covering substantially the entire transverse width of said outer surfaces of the flanges of said torque-receiving legs for supporting said calipers for movement perpendicular to the plane of said brake disc, said torque being received directly by at least one of said legs, and means for restraining radial movement of said calipers with respect to said disc, said restraining means being individual plates mounted rigidly on said guide members with said calipers being slidably movable between cooperating ones of said guide members and said plates.

2. The improvement in the fixing member for disc brake of claim 1 wherein said guide members are formed with opposed parallel edges each containing an elongated notch to form opposing ledges for slidably mounting said calipers.

3. The improvement in the fixing member for disc brakes of claim 2 wherein said friction members comprise friction pads contacting said brake disc and individual backing plates for supporting said friction pads and wherein one of said friction members interacts with said torque-receiving legs by direct contact with the individual backing plate, whereas the other of said friction members interacts with said torque-receiving members by contact of the individual backing plate with the ledges of the guide members.

* * * * *